Nov. 25, 1952 — L. R. BUCKENDALE — 2,619,202
SPIDER MOUNTED BRACKET FOR AIR BRAKES
Filed Jan. 24, 1949
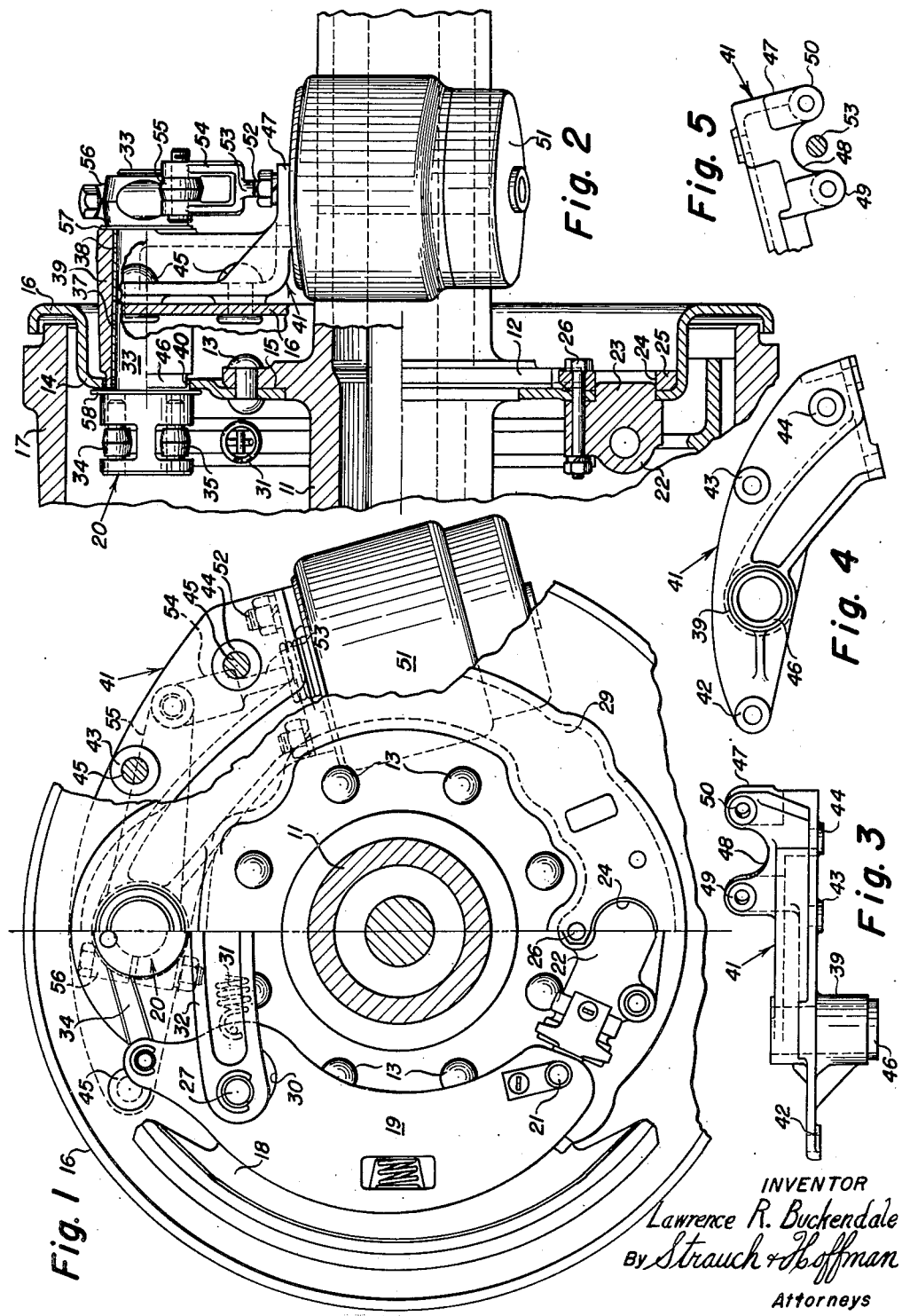
INVENTOR
Lawrence R. Buckendale
By Strauch & Hoffman
Attorneys Patented Nov. 25, 1952

2,619,202

UNITED STATES PATENT OFFICE 2,619,202

SPIDER MOUNTED BRACKET FOR AIR BRAKES

Lawrence R. Buckendale, Detroit, Mich., assignor to The Timken-Detroit Axle Company, Detroit, Mich., a corporation of Ohio Application January 24, 1949, Serial No. 72,287

3 Claims. (Cl. 188—152)

1

This invention relates to an improved vehicle brake mechanism and is particularly directed to a novel bracket, cam shaft and operating linkage arrangement by which an air or other pressure motor may be mounted close to the wheel without interference with the spring or other undergear of the vehicle.

The invention in particular comprises novel arrangements arising from the provision of a special bracket which is mounted in a novel manner upon an axle mounted support plate that serves both as a dust shield and to carry the brake shoes and associated parts, and which bracket supports the pressure motor, the brake cam shaft and the actuating connections therebetween all in compact relation in close proximity to the vehicle wheel between the vehicle wheel and the nearest spring seat mounting on the axle.

It is therefore a major object of my invention to provide a novel brake mechanism and mounting assemblage disposed in close proximity to the vehicle wheel free from interference with the spring seat attachments on the axle but disposed at the elevation of the axle so as not to be exposed to injury from rocks and other roadway impediments during vehicle movement.

It is a further object of my invention to provide a novel bracket for attachment to the brake mechanism support plate of a vehicle for carrying a relatively short cam shaft and a fluid pressure motor for operating the shaft.

It is a further object of my invention to provide a novel fluid pressure operated brake mechanism which is mounted close to the vehicle wheel so that only a very short cam shaft is needed and wherein the fluid pressure cylinder is secured upon the axle with its axis normal to the axis of the axle.

Further objects of the invention will appear as the description proceeds in connection with the appended claims and the annexed drawings wherein:

Figure 1 is an end elevation of a vehicle axle, partially broken away and partially in section to show the novel mounting of my brake actuating mechanism;

Figure 2 is a rear elevation partly in section, illustrating the brake mechanism of Figure 1 at one end of the axle and particularly the disposition of the pressure cylinder bracket on the mounting plate;

Figure 3 is a plan view of the special bracket of the invention by which the motor cylinder is attached to the brake mounting plate; and

2

Figure 4 is a front elevation of the bracket of Figure 3;

Figure 5 is an end view looking upwardly at the lower end of the bracket of Figure 4.

In its preferred embodiment the invention will be described as attached to a drive axle housing although it will be understood that the mechanism can be attached to any axle or axle beam without departing from the spirit of the invention.

Referring to Figures 1 and 2, a generally horizontal tubular axle housing 11 is formed near one end with an integral radial brake attachment flange 12. Opposite sides of the axle are identical and only one side is shown in Figure 2. Secured upon flange 12, as by a circumferential series of spaced rivets 13, is a brake mounting plate and dust shield 14 which in the illustrated embodiment of the invention is an annular sheet metal member pressed to desired configuration. Preferably a machined shoulder 15 is provided on the outer periphery of flange 12, and both plate 14 and flange 12 are provided with a series of mating rivet receiving apertures which are aligned for reception of the rivets during assembly so that the dust shield becomes a substantially permanent rigid part of the axle when it is secured thereto by rivets 13.

As illustrated best in Figure 2, the plate 14 is bent inwardly and formed about its outer periphery with an annular recess or channel 16 that faces the adjacent end of the axle and overlies the edge of a brake drum 17 attached to the vehicle wheel (not shown) mounted on the outer end of the axle 11. The bottom of channel 16 lies in a vertical plane.

As illustrated best in Figure 2, plate 14 comprises a substantially rigid radial extension of the flange 12; and in the invention the entire brake mechanism including the shoes, levers, cams and adjustment means are supported on the outer side of plate 14 so as to be protected from the entry of dust and water from the inner side of the axle, and a special bracket is attached to the inner side of plate 14 for mounting the fluid pressure cylinder, the cam shaft and the motion transmitting mechanism therebetween in a position to be protected from injury by road objects.

The illustrated brake mechanism comprises at each side a brake shoe 18 rockably and slidably mounted on a lever 19 pivoted upon a lower anchor pin 21 on a single point adjustment assembly housing 22. Housing 22 is secured rigidly and non-rotatably upon the outer side of plate 14 as by having a non-circular projection 23 fitting into a mating aperture 24 in the lower end of plate 14, a reinforcement block 25 welded to plate 14 and one or more bolt assemblies 26 that clamp the housing to the reinforced plate 14.

The lower anchor pins 21 may be simultaneously adjusted by the adjustment mechanism within housing 22, and this single point support and simultaneous anchor pin adjustment arrangement for the otherwised fixed anchor pins 21 is preferably the same as that disclosed in Serial No. 614,109 filed September 4, 1945, which has matured into United States Letters Patent No. 2,560,551 dated July 17, 1951 and to which reference is made for further details if necessary to understand the present invention.

Each upper anchor pin 27 is, as illustrated in Figure 1, rigidly supported in a suitable reinforcing block welded within the annular channeled intermediate portion 29 of plate 14. Preferably this channeled construction of the plate 14 and the manner of supporting the upper anchor pins in this channel is the same as illustrated in United States Letters Patent No. 2,432,983 issued December 23, 1947 to which reference is made for further details. Each lever is slotted as at 30 to provide for freedom of rocking of the lever about the lower anchor pin 21 during application of the brake shoes to the drum 17 and a spring 31 interconnects the upper ends of the levers. A brace 32 rigidly connects the inner ends of the upper anchor pins 27 for further reinforcing plate 14 during operation.

Between the upper ends of the brake lever assemblies 19 is disposed a cam head 20 mounted on the end of a rotatable cam shaft 33 and comprising a pair of eccentrically pivoted links 34 and 35 that are pivotally connected to the upper ends of the respective lever assemblies 19. Rotation of cam head 20 in either direction will spread or retract the brake shoes for application or release of the brakes. This type of brake cam and its operation upon this type of brake lever and shoe assembly is disclosed in United States Letters Patent No. 2,435,955 issued February 17, 1948 to which reference is made for further detail if needed to understand the present invention.

Cam shaft 33 is mounted for rotation on an axis parallel to the axle in spaced bearing sleeves 37 and 38 within a hollow substantially cylindrical boss 39 which, as illustrated best in Figures 2 and 3, is an integral part of a bracket member 41 that is adapted to be attached to plate 14 and that carries both the cam shaft and the fluid pressure responsive motor later to be described.

With particular reference to Figures 3–5, bracket 41 is also formed with three spaced hollow bosses 42, 43 and 44 which are adapted to align with three mating apertures distributed on an arc along the channeled periphery 16 of plate 14 for receiving a series of rivets 45 to rigidly attach bracket 41 to plate 14.

When the bracket is secured in such position (Figure 2) the shouldered inner end 46 of boss 39 is piloted within an aperture 40 formed in plate 14 thereby locating shaft 33 in proper assembly with the brake mechanism on the other side of the plate 14, and the axle housing, plate 14 and bracket 41 become in the final assembly a permanent rigid construction.

At its end opposite the boss 39, bracket 41 is integrally formed with a lateral flange 47 which extends away from plate 14 in the assembly and is formed with a central circular recess 48 whereby it appears as a bifurcated member having spaced hollow bosses 49 and 50 in the opposite arms. The purpose of this flange 47 is to secure and support the cam shaft operating motor, which in this case is an air pressure cylinder 51, upon the bracket. This attachment is effected as by studs 52 rigid with cylinder 51 and extending through bosses 49 and 50.

Cylinder 51 contains a piston (not shown) subjected to differential air pressures and a piston rod 53 projects through the cylinder casing in axial alignment to be pivotally secured at its bifurcated end 54 to the end of a crank lever 55 that is rigidly secured to the inner end of cam shaft 33 as by a split boss and clamping bolt assembly indicated at 56. When the piston rod 53 is reciprocated by air pressure differentials in the cylinder casing, this will result in rocking the cam shaft 33 to apply or release the brake shoes with respect to the drum. Preferably end thrust washers 57 and 58 are employed between shaft 33 and the rigid mounting plate and bracket assembly for reducing end play and wear.

I have therefore provided a novel mounting assembly for my air motor, cam shaft and operating linkage which is easy to install in the correct position on the brake mounting plate and which locates the motor with its piston rod axis substantially normal to the axis of the axle, the cylinder casing itself being located preferably just to the rear of the bulk of the axle whereby it is protected against injury by objects arising from or upon the road as the vehicle moves forward. Should the air cylinder 51 become damaged it is easily removable without removing the bracket from the axle. Should it be desired to replace the entire motor and linkage assembly or replace or repair the cam assembly without disturbing the bracket, this is easily done by releasing the clamp at 56 and the studs 52.

Cylinder 51 is located closely adjacent the spider 16 and within the longitudinally projected outline of the spider or drum (Figure 1) so that a compact protected assemblage is provided wherein the axis of motor 51 lies in a plane that is substantially normal to a plane containing a radius of the brake drum passing through the motor housing. Referring to Figure 1 it will be seen that bracket flange 47 is parallel to a plane passing through the housing of motor 51 and containing a radius of the brake drum.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle axle assembly having a brake drum, a brake mechanism mounting plate adapted to enclose the inner end of the brake drum secured upon the axle, said plate extending rigidly radially outwardly from the axle, a bracket secured rigidly upon the inner side of said plate and having near its upper end a hollow boss projecting at one end into an aperture in said plate, a brake operating cam shaft rotatably mounted in said boss and projecting through said plate, brake shoes and associated operating means mounted on the other side of said plate and operably connected to said shaft a flange projecting away from said plate on the lower end of said bracket for mounting a fluid pressure responsive motor closely adjacent both said axle and the inner side of said plate and substantially within the longitudinally projected outline of said drum, and motion transmitting linkage interconnecting the motor with said shaft.

2. In a vehicle axle assembly having a brake drum, a brake mechanism mounting plate adapted to enclose the inner end of the brake drum secured upon the axle, said plate extending rigidly radially outwardly from the axle and comprising an annular member secured about a radial flange on said axle housing and having a channeled periphery which is adapted to extend over a brake drum so as to provide a dust shield for the brake mechanism mounted thereupon, a bracket secured rigidly upon the inner side of said plate and having near its upper end a hollow boss communicating with an aperture in said plate, said bracket being secured along a sector of said channeled periphery, a brake operating cam shaft rotatably mounted in said boss and projecting through said plate, brake shoes and associated operating means mounted on the other side of said plate and operably connected in said shaft, means adjacent the lower end of said bracket for mounting a fluid pressure responsive motor closely adjacent both said axle and the inner side of said plate and substantially within the longitudinally projected outline of said drum, and motion transmitting linkage interconnecting the motor with said shaft.

3. A bracket for mounting a brake actuating mechanism adjacent a brake mechanism support plate comprising an arcuate web portion having a plurality of fastener receiving apertures distributed along an arc for attachment of said bracket to said plate, a short integral hollow cam shaft mounting boss projecting from one side of said web near one end of said web, and a brake actuating motor support flange projecting at right angles to said web at the other end of said web, said flange having fastener receiving apertures for receiving fastener elements to removably secure it to a motor assembly and being adapted to mount a brake actuating motor substantially within the longitudinally projected outline of said plate.

LAWRENCE R. BUCKENDALE.

REFERENCES CITED

The following references are of record in the file of this patent:

UNITED STATES PATENTS

| Number | Name | Date |
|---|---|---|
| 1,575,737 | Craig | Mar. 9, 1926 |
| 1,944,921 | Christensen | Jan. 30, 1934 |
| 2,331,652 | Buckendale | Oct. 12, 1943 |